US012676831B2

(12) United States Patent
   Sutherland

(10) Patent No.:     US 12,676,831 B2
(45) Date of Patent:          Jul. 7, 2026

(54) SYSTEMS AND METHODS FOR UNIQUELY LABELING EGRESS TRAFFIC FROM SECURE SERVICE EDGE (SSE) PLATFORMS

(71) Applicant: Zscaler, Inc., San Jose, CA (US)

(72) Inventor:  Edwin Sutherland, Bletchley (GB)

(73) Assignee: Zscaler, Inc., San Jose, CA (US)

( * ) Notice:   Subject to any disclaimer, the term of this patent is extended or adjusted under 35 U.S.C. 154(b) by 96 days.

(21) Appl. No.: 18/613,328

(22) Filed:      Mar. 22, 2024

(65)                Prior Publication Data

US 2025/0300963 A1      Sep. 25, 2025

(51) Int. Cl.
   *H04L 9/40*              (2022.01)
(52) U.S. Cl.
   CPC ................................ *H04L 63/0236* (2013.01)
(58) Field of Classification Search
   CPC ............. H04L 12/4679; H04L 41/0895; H04L 41/5041; H04L 45/50; H04L 45/7453; H04L 63/1425; H04L 41/0816; H04L 45/74; H04L 61/251; H04L 69/16
   See application file for complete search history.

(56)                References Cited

U.S. PATENT DOCUMENTS 12,438,957 B1 * 10/2025 Ranns ................... H04L 61/251
 2015/0271067 A1 *  9/2015 Li ........................... H04L 45/50
                                                           370/392
 2016/0173338 A1 *  6/2016 Wolting ................. H04L 45/74
                                                           709/223
 2019/0028376 A1 *  1/2019 Ganapathy .......... H04L 45/7453
 2019/0104413 A1 *  4/2019 Cidon ................. H04L 12/4679
 2020/0128114 A1 *  4/2020 Kloberdans ............. H04L 69/16
 2020/0274945 A1 *  8/2020 Rolando ............. H04L 41/0816
 2021/0021486 A1 *  1/2021 Jain ..................... H04L 41/5041
 2021/0314415 A1 * 10/2021 Rolando ............. H04L 41/0895
 2024/0187438 A1 *  6/2024 Hofmann ............. H04L 63/1425

* cited by examiner

*Primary Examiner* — Dustin Nguyen
(74) *Attorney, Agent, or Firm* — Baratta Law PLLC; Lawrence A. Baratta, Jr.; Ryan Odessa

(57)                ABSTRACT

Systems and methods for uniquely labeling egress traffic from Secure Service Edge (SSE) platforms include intercepting traffic at cloud, wherein the traffic is associated with a tenant of one or more tenants of the cloud, and wherein the traffic is destined for an application; labeling the traffic with an egress Internet Protocol (IP) address and a unique hash value; and forwarding the traffic including the egress IP address and the unique hash value to the application. The unique hash value is unique to the tenant and identifiable by the application for determining the tenant of the one or more tenants based thereon.

20 Claims, 8 Drawing Sheets

400

INTERCEPTING TRAFFIC AT CLOUD, WHEREIN THE TRAFFIC IS ASSOCIATED WITH A TENANT OF ONE OR MORE TENANTS OF THE CLOUD, AND WHEREIN THE TRAFFIC IS DESTINED FOR AN APPLICATION — 402

LABELING THE TRAFFIC WITH AN EGRESS INTERNET PROTOCOL (IP) ADDRESS AND A UNIQUE HASH VALUE — 404

FORWARDING THE TRAFFIC INCLUDING THE EGRESS IP ADDRESS AND THE UNIQUE HASH VALUE TO THE APPLICATION — 406

SYSTEMS AND METHODS FOR UNIQUELY LABELING EGRESS TRAFFIC FROM SECURE SERVICE EDGE (SSE) PLATFORMS

FIELD OF THE DISCLOSURE

The present disclosure generally relates to network and cloud security. More particularly, the present disclosure relates to systems and methods for uniquely labeling egress traffic from Secure Service Edge (SSE) platforms.

BACKGROUND OF THE DISCLOSURE

Internet Protocol (IP) allowed list controls in Software-as-a-Service (Saas) applications provide a security feature that restricts access to the application based on specific IP addresses. This mechanism is designed to enhance the overall security of the SaaS platform by allowing only designated IP addresses to interact with the application's resources. These controls are particularly valuable in scenarios where enterprises want to limit access to their SaaS applications to specific locations or networks, such as allowing access only from the corporate office or a set of trusted partners. It helps prevent unauthorized users or potential attackers from gaining entry to sensitive data and resources. Although, with employees working remotely, their traffic is not always funneled back to a data center as it once was. Rather, as enterprises transition to more modern approaches of cybersecurity, their traffic typically flows through a Secure Service Edge (SSE) platform and straight to the application therefrom. This introduces various issues due to a lack of unique egress IP addresses for each of the tenants of the SSE platform. Thus, the present disclosure provides systems and methods for uniquely labeling traffic being forwarded from SSE platforms, making it possible to enforce policy at the application level while utilizing IP allowed list controls.

BRIEF SUMMARY OF THE DISCLOSURE

The present disclosure relates to systems and methods for uniquely labeling egress traffic from Secure Service Edge (SSE) platforms. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include intercepting traffic at cloud, wherein the traffic is associated with a tenant of one or more tenants of the cloud, and wherein the traffic is destined for an application; labeling the traffic with an egress Internet Protocol (IP) address and a unique hash value; and forwarding the traffic including the egress IP address and the unique hash value to the application.

The steps can further include wherein the cloud operates as a Secure Service Edge (SSE) provider for the tenant. The application can be a Software-as-a-Service (Saas) application or hosted applications of various forms requiring an allowed list. The forwarding can include forwarding the traffic via an Internet Protocol version 6 (IPv6) network, wherein the unique hash is inserted thereto as a flow label. The steps can further include generating one or more unique hash values for each of the one or more tenants of the cloud. The steps can further include communicating the one or more unique hash values of each of the one or more tenants to the application. Communicating the one or more unique hash values of each of the one or more tenants to the application can be performed by an administrator of each of the one or more tenants. The steps can further include establishing an Application Programing Interface (API) integration between the cloud and the application; and communicating the egress IP and the one or more unique hash values of the one or more tenants to the application via the API integration. The steps can further include regenerating the one or more unique hash values for each of the one or more tenants of the cloud periodically; and communicating the egress IP and the one or more regenerated unique hash values of the one or more tenants to the application via the API integration. The unique hash value is unique to the tenant and identifiable by the application for determining the tenant of the one or more tenants based thereon.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for uniquely labeling egress traffic from Secure Service Edge (SSE) platforms. Various embodiments of the present systems and methods introduce the utilization of an SSE provided IP egress block (egress IP address) in combination with a pseudo hash value that uniquely identifies a specific tenant to comply with allowed list controls. Thus, whenever user traffic associated with a tenant of the SSE platform exits the SSE platform, the traffic will be uniquely identifiable back to the specific tenant. The SaaS application, or other destination of the like, can be configured to not only check for the source IP, but to also check for the unique hash value for performing identification.

§ 1.0 Cybersecurity Monitoring and Protection Examples

Figure 1A:
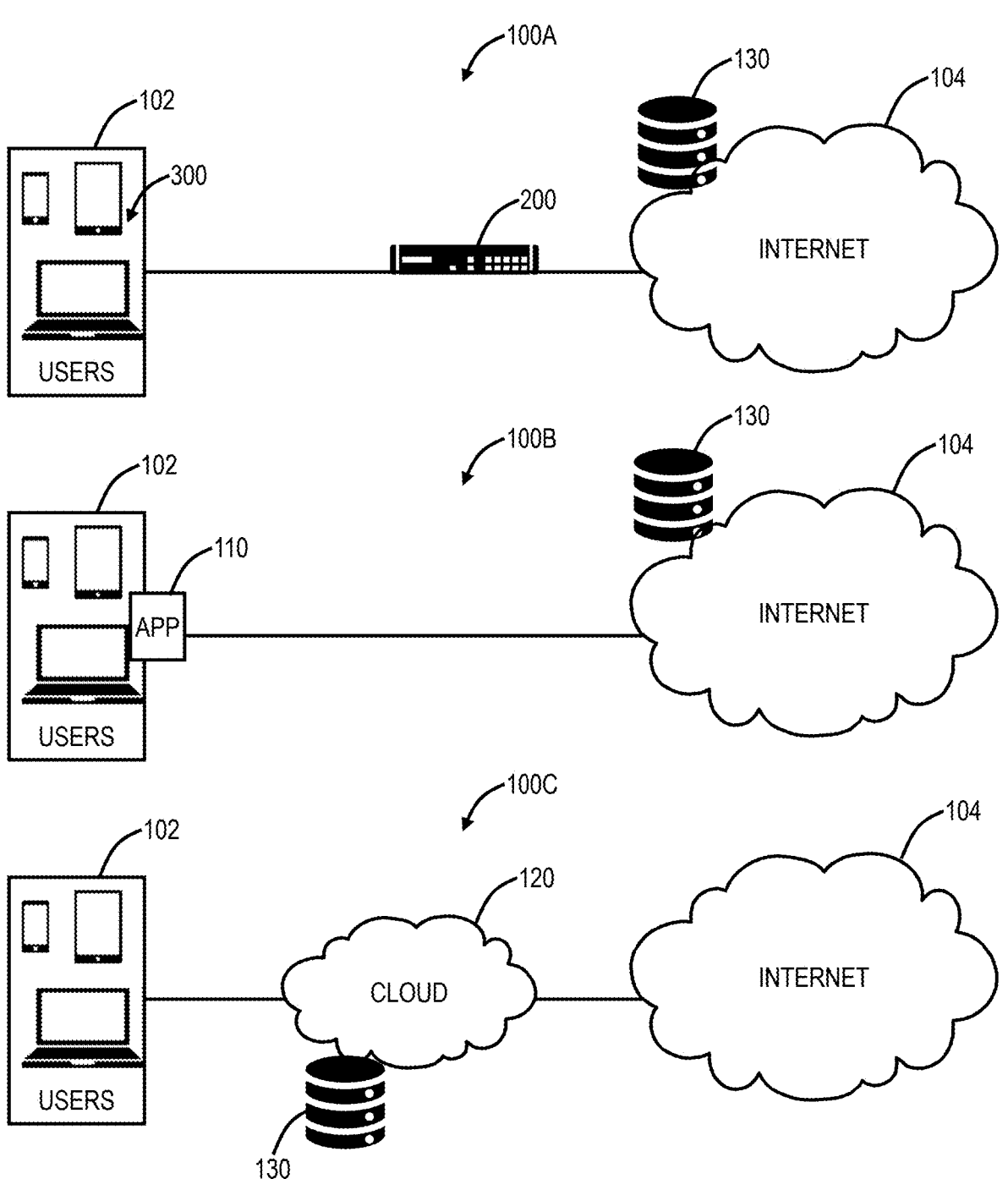
FIG. 1A is a network diagram of three example network configurations of cybersecurity monitoring and protection of a user.
Figure 2:
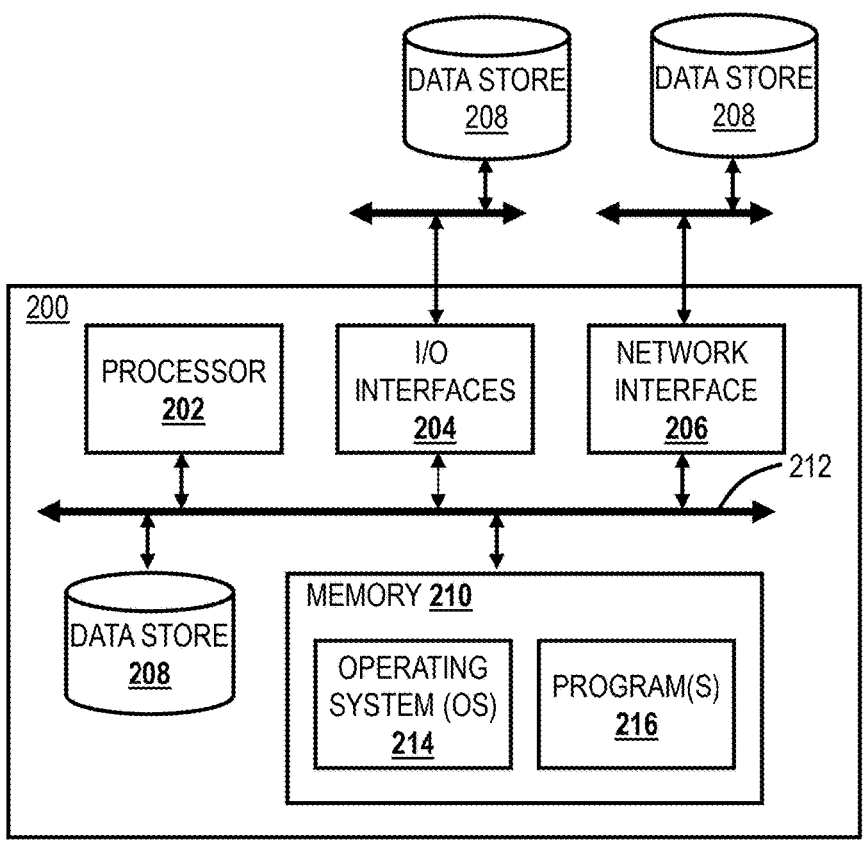
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
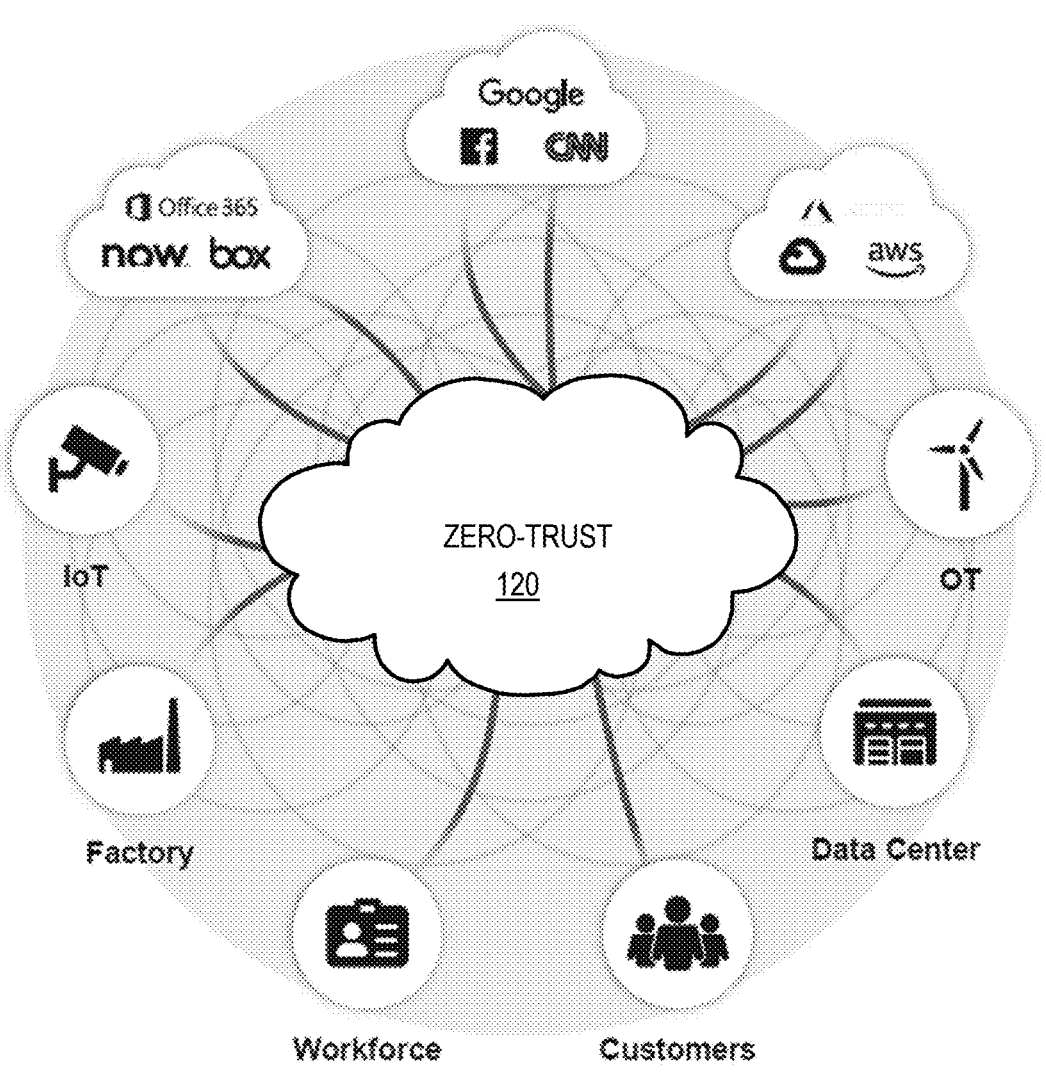
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize that the cloud 120 ultimately runs on one or more physical servers 200, virtual machines, etc.

§ 3.0 Example Computing Device Architecture

Figure 3:
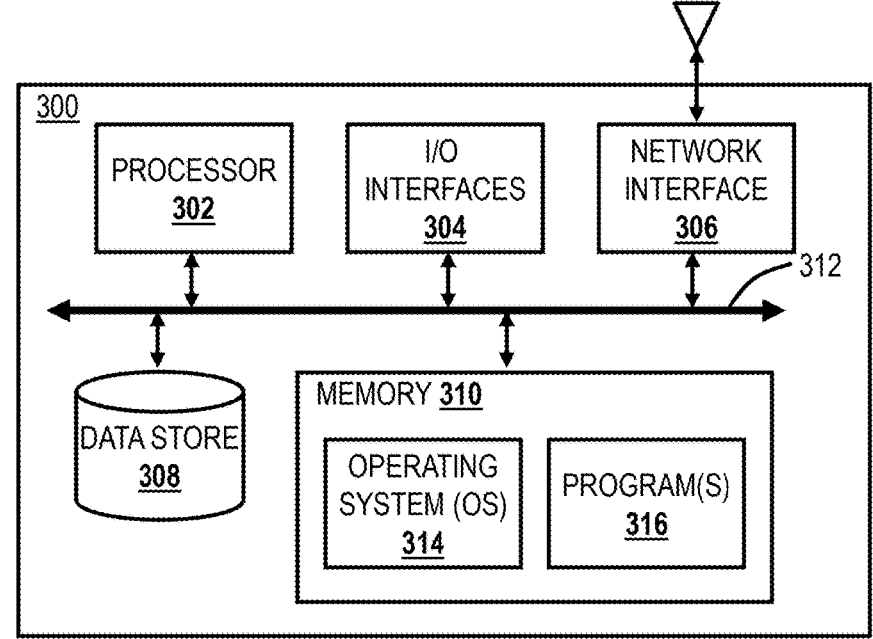
FIG. 3 is a block diagram of a computing device.

FIG. 3 is a block diagram of a computing device 300, which may be realized as an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
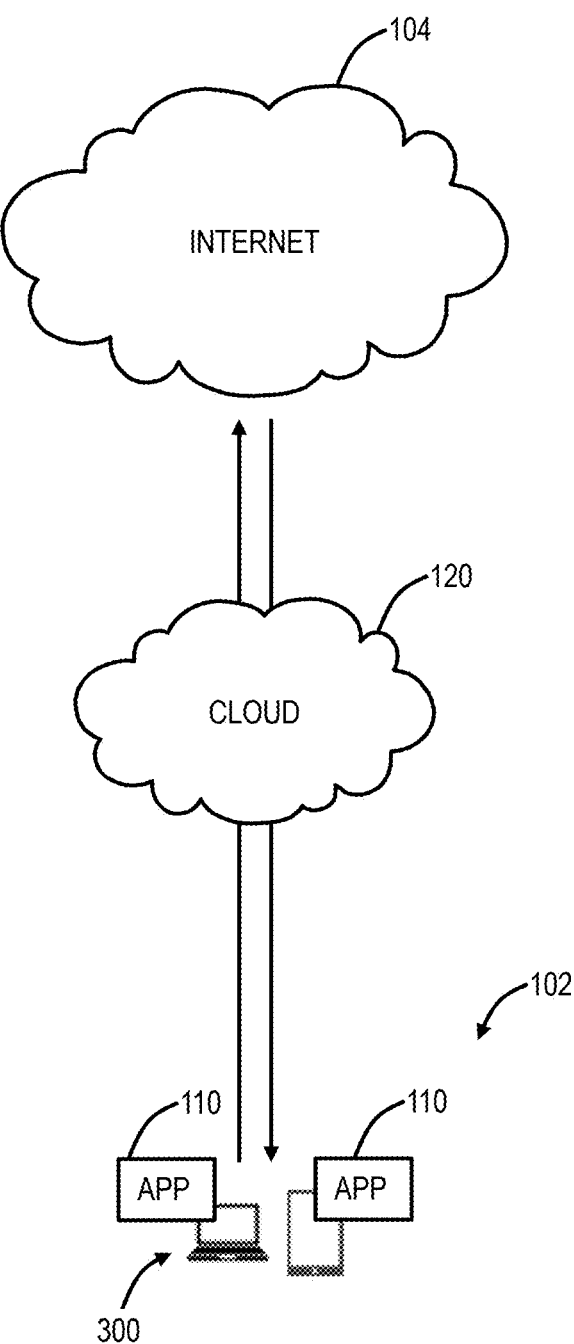
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user 102 setup.

§ 5.0 Unique Hash Value Insertion for Origin Identification

The present disclosure relates to systems and methods for uniquely labeling egress traffic from Secure Service Edge (SSE) platforms. With a rise in remote and hybrid enterprise architectures, SSE providers, such as the cloud 120 described herein, offer an architectural transformation, moving enterprises from on premises security architecture to one which leverages an edge based design to provide security and optimal connectivity as close to enterprise users as possible. However, one challenge enterprises face in adopting an SSE based architecture is that of complying with application providers Internet Protocol (IP) allowed list controls.

Traditionally, applications hosted by third party providers and made available to customers over the internet such as Software-as-a-Service (SaaS) applications utilize an allowed list model as an initial layer of security to ensure only authorized tenants can make requests to their services. This is achieved by using a packet filtering system to inspect the source IP address of a tenant's originating traffic. For such models to operate, an enterprise administrator of an enterprise requiring access to the application must provide one or more IP addresses that they can guarantee all their employees traffic will originate from. These IP addresses are added to the application providers allowed list of source IP addresses. Therefore, on the application/destination side, responsive to receiving various requests from employees of the enterprise, the application will see the one or more source IP addresses and allow access to the tenant for the employees to utilize the application. These methods of allowing access are based on the IP allow list only. When enterprise traffic of employees originates from a single exit point of a data center, these methods are acceptable. Although, today, with employees working remotely, their traffic is not funneled back to a data center. Rather, their traffic typically flows through an SSE platform and straight to the application, it will be appreciated that the term application can refer to any of SaaS, remote resources, Infrastructure-as-a-Service (IaaS), public or private applications, and the like.

Challenges with traditional methods, such as the methods described above, arise due to SSE vendors, such as the cloud 120 described herein, utilizing a shared IP egress block across their customers. That is, the cloud 120 operates as a Secure Service Edge (SSE) provider for the tenant. Thus, a customer of a SaaS application which utilizes an SSE platform cannot guarantee to the SaaS application that their source IP address will be the exact one dedicated to them. This causes the traditional allow list model to become obsolete.

Various solutions have emerged in order to solve these issues such as dedicated egress IPs, in which an SSE provider can set a dedicated egress IP for a particular tenant. Even with such a solution, more issues can be introduced because dedicated egress IPs tend to be scoped either per country or per region. Thus, if a user is not within that region, their traffic will not "originate" from the dedicated egress IP address.

In order to comply with allowed list controls utilized by application providers, enterprises are forced to hairpin all application traffic back to selected Internet egress sites (e.g. Data Center, Head Quarters, etc.) to ensure valid source IP addresses are used. This comes at the cost of impacting users' experience as additional latency is ultimately introduced with such sub-optimal routing of application traffic. Further, allowed list control can be subject to source IP spoofing, hindering it from being a strong security control to assess tenant traffic.

As studies have shown, most enterprises are moving towards an SSE model. Because of this, the systems and methods described herein aim to resolve the issues described above. Various embodiments of the present systems and methods introduce the utilization of an SSE provided IP egress block in combination with a pseudo hash value that uniquely identifies a specific tenant to comply with allowed list controls. Thus, whenever user traffic associated with a tenant of the SSE platform (the cloud 120) exits the cloud 120, the traffic will be uniquely identifiable back to the specific tenant. The SaaS application, or other destination of the like, can be configured to not only check for the source IP, but to also check for the unique hash value for performing identification.

In various embodiments, the present solution is mapped to the utilization of Internet Protocol version 6 (IPv6) headers.

This is because, with IPv6, header information called a flow label can be used to communicate the hash value which is put in the header. More particularly, the forwarding of traffic from the cloud 120 to the application includes forwarding the traffic via an IPv6 network, wherein the unique hash is inserted thereto as a flow label. The present disclosure provides a plurality of methods for providing this information, i.e., the IP egress block and the hash value, to destinations. To uniquely identify a tenant without relying on a dedicated egress IP address, the use of the IPv6 flow label is repurposed to identify a tenant, i.e., by creating a unique hash value, and communicating the hash value via the flow label section of the IPv6 header. All traffic egressing the cloud 120 will include the hash value generated from the platform's unique tenant ID. As an example, a 20 bit hash can be generated, allowing precisely 1048576 unique values to be generated. In various embodiments a pseudo hash generator can be used within the cloud 120 to generate and guarantee that a hash is unique per tenant. In various embodiments, the hash generated by an SSE platform is locally significant to that SSE platform and the hash is not globally unique. That is, from an application provider perspective, they can assess the SSE vendors block of egress IP addresses and the hash value to guarantee uniqueness across their multi-tenant estate.

In an embodiment, communication of the IP egress block and hash value can be performed manually, where the pseudo hash value is generated by the cloud 120, and an allow list is created in the destination's environment by an administrator. Again, the destinations allow list control policy can be modified to further inspect the hash value in addition to the egress IP for performing policy enforcement. That is, the pseudo hash value is generated by the cloud 120 or an administrator and consumed by the application provider for performing identification and enforcing policy. Once the hash value of a tenant is generated, and the allow list controls are set in the destination environment, the cloud 120 will provide the pairing of the IP egress block and the unique hash with traffic to the destination, i.e., within the flow label. In this way, the destination knows that the information provided by the cloud 120 uniquely identifies the tenant which they are providing access to. Thus, in such embodiments, an administrator will copy the information, i.e., the IP block and the hash value, to the application platform as described for the allowed list model above.

In another embodiment, an automated process for communicating the IP egress block and hash value is contemplated. In such embodiments, an Application Programing Interface (API) integration between the cloud 120 and the destination (application) is established to allow the cloud 120 to securely communicate the IP egress block, hash value, and any other information for identifying a tenant to the destination. Responsive to the cloud 120 communicating the IP egress block and one or more hash values for allow list control for one or more tenants, the destination can use the communicated information to enforce policy because each of the one or more hash values is associated with a specific tenant. An advantage of such an automated model further includes the ability to periodically rotate and/or update hash values of tenants for added security. For example, the cloud 120 can generate a plurality of unique hash values for each of its tenants, automatically communicate the plurality of unique hash values to the destination, and periodically repeat these steps by regenerating the plurality of unique hash values and communicating the updated hash values to the destination. Again, this eliminates the risk of IP spoofing by rotating/updating the unique identifiers of tenants.

Figure 5:
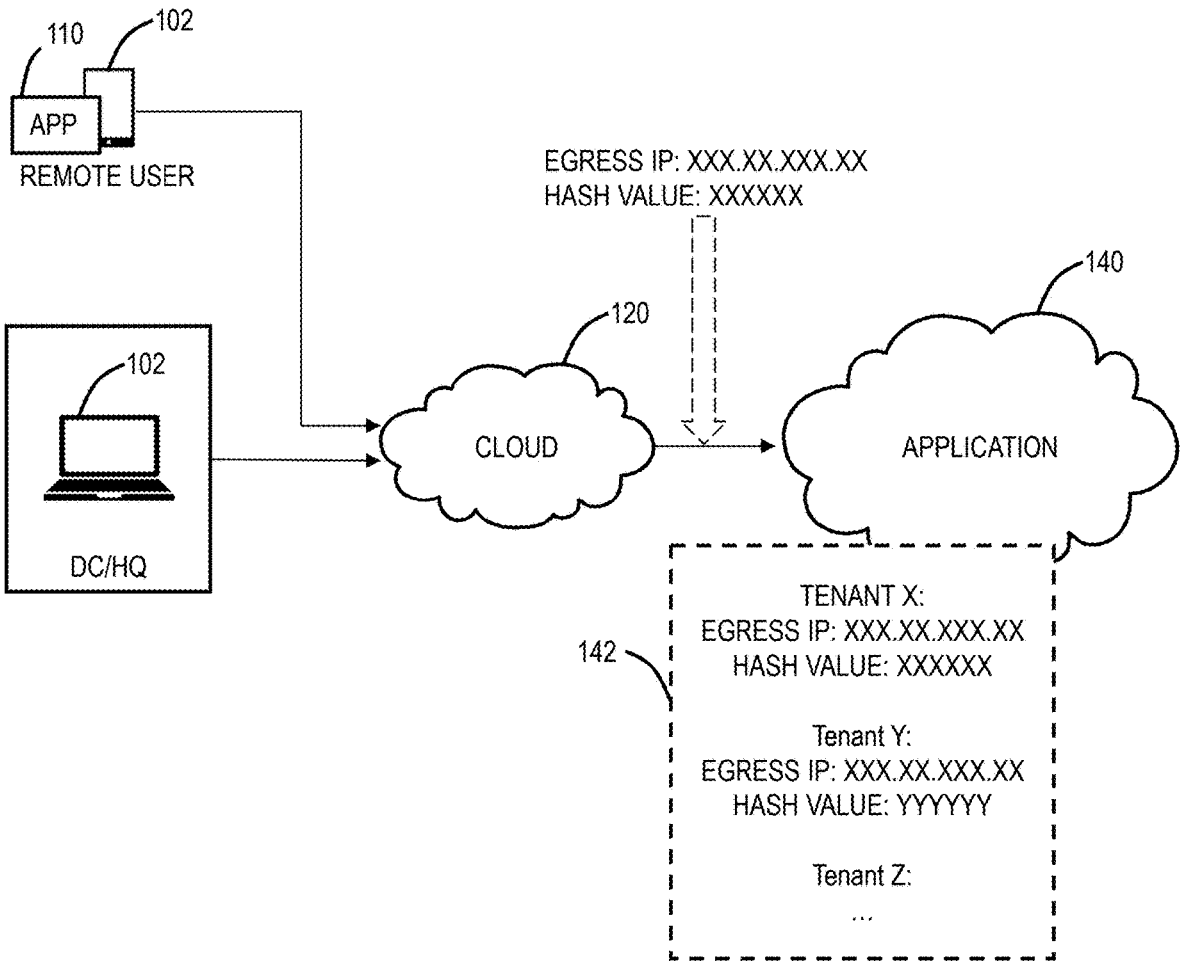
FIG. 5 is a flow diagram of a network configuration illustrating an SSE providing unique egress identification for its tenants.

FIG. 5 is a flow diagram of a network configuration illustrating an SSE (cloud 120) providing unique egress identification for its tenants. Again, tenants of the cloud 120 and the application 140 can be located remotely, or in a Headquarters (HQ) location, where all traffic is forwarded through a Data Center (DC). Because all traffic originating for tenants of the cloud 120 are ingested and controlled by the cloud 120, the present systems and methods can be enabled. The cloud 120 identifies the tenant from which the request is originating from and forwards the traffic to its proper destination, i.e., an application 140, wherein the traffic is forwarded with the egress IP and the unique hash value associated with the tenant. Upon receiving the request at the application 140, the application 140 can identify the tenant based on the unique pairing of the egress IP and hash value by referencing the allow list 142. Again, prior to the steps shown in FIG. 5, the one or more unique hash values of each of the one or more tenants of the cloud 120 must be communicated to the application 140. The communication methods can include any of the manual and automated methods described herein. More specifically, for example, an API integration can be established between the cloud 120 and the application, and communicating the egress IP and the one or more unique hash values of one or more tenants to the application can be via the API integration. Also, in various embodiments, regeneration of the one or more unique hash values for each of the one or more tenants of the cloud can be performed periodically, i.e., every day, week, month, etc., and communicating the egress IP and the one or more regenerated unique hash values of the one or more tenants to the application via the API integration can be performed based thereon.

In various embodiments, the application 110 can be utilized to perform the steps described herein. More particularly, in a network configuration such as the configuration depicted in network configuration 100B, the application 110 can be utilized to facilitate the unique labeling of egress traffic. For example, the network configuration 100B includes an application 110 that is executed on the computing device 300. The application 110 can perform similar functionality as the server 200 and the cloud 140. In various embodiments, the application 110 and the cloud 120 can maintain the unique hash values of tenants thereon. The is, the application can persist the unique hash value of the tenant to which the computing device 300 is associated with. Based thereon, the application 110 can perform the inserting of the egress IP and the unique hash into traffic destined for an application. Additionally, because the application 110 and the cloud 120 are communicatively couped, the cloud can communicate any updated unique hash values to the application 110 as described herein.

By utilizing the various embodiments described herein, SSE providers do not need to acquire a large range of dedicated egress IPs to dedicate to customers and a shared egress IP can continue to be utilized, which all SSE providers do by default. Using the hash value and IP egress block pairing, SSE providers can provide a guarantee to application providers that the traffic coming from that SSC includes a unique hash and IP block pairing for different tenants, thereby allowing destinations such as SaaS applications to identify what tenant traffic is originating from.

The systems and methods described herein introduce additional capabilities into existing allowed list access control systems. That is, relying solely on IP addresses can be avoided while ensuring a more robust mechanism to uniquely identify a tenant. Various embodiments of the present solution are constrained to IP header information to ensure a wider adoption by allowed list control systems. Generally, application providers use a range of physical and virtual appliances such as routers, switches, and firewalls as packet filters to achieve enforcing allowed list access control. Various embodiments of the present systems rely on IPv6 source IP address and IPv6 flow label header information to create a tuple that uniquely identifies a tenant represented by an SSE vendor when delivering traffic to application providers.

Figure 6:
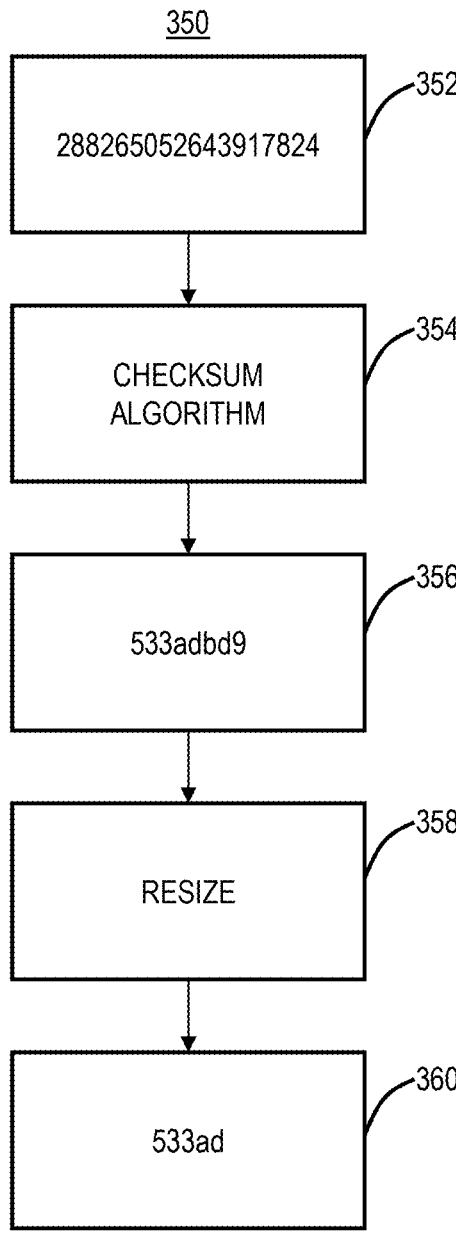
FIG. 6 is a flow diagram of a unique hash value generation process.

FIG. 6 is a flow diagram of a unique hash value generation process. In various embodiments, to generate the unique hash value 360, the following process is performed. An SSE tenant ID value 352 is retrieved/received as an input for the unique hash generation process 350. An algorithm for computing a position-dependent checksum 354, such as Fletcher 32, is utilized to generate a hash using the SSE tenant ID value 352 as input and formats the output as a hex value 356. The hash is then resized 358 from 32 bit to 20 bit in order to fit the IPv6 flow label size. The result of the resized hash is the unique hash value 360.

Figure 7:
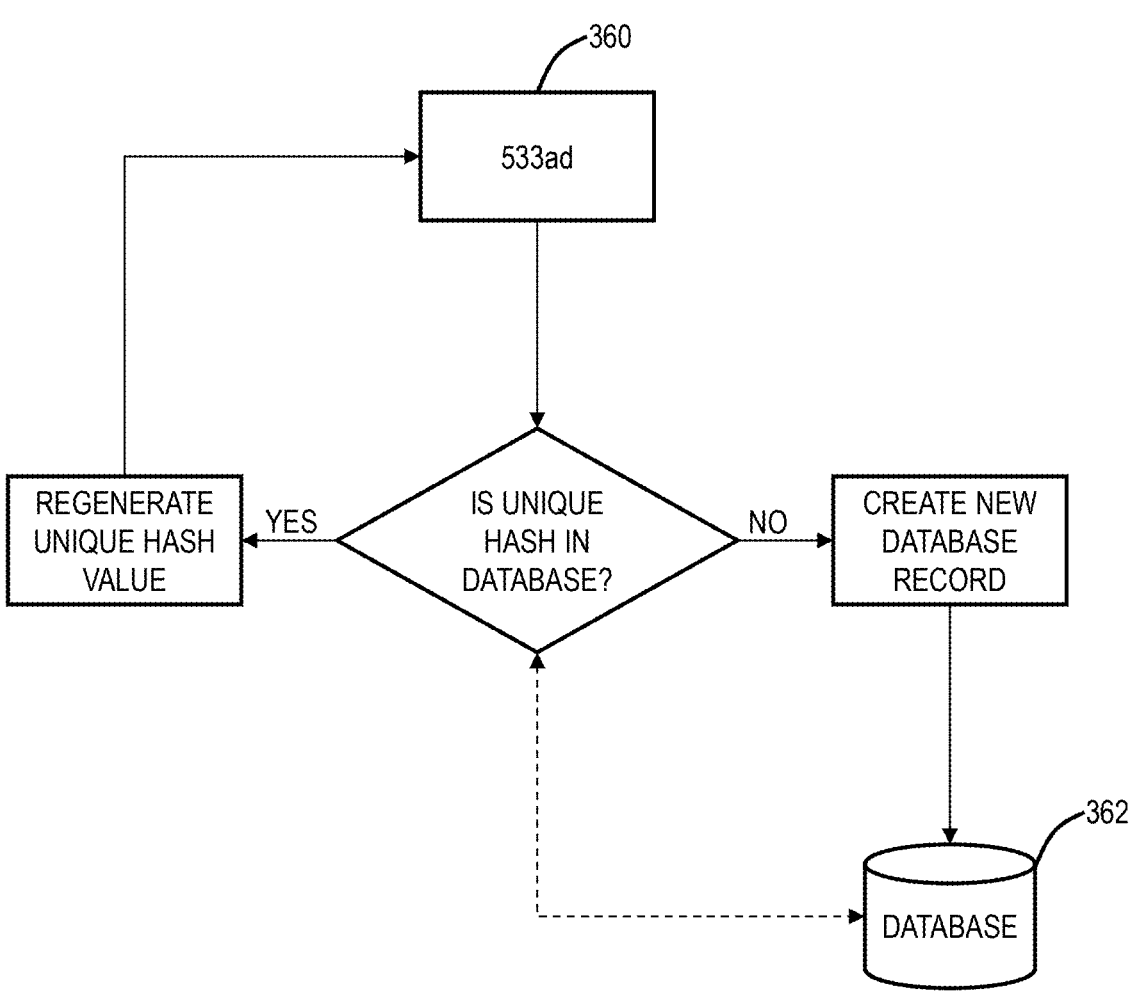
FIG. 7 is a flow diagram of a process for removing duplicate unique hash values.

Once the final unique hash value 360 is generated, it is vital that it is validated against a database that tracks hash, tenant id mapping to remove a unique hash value duplication scenario. FIG. 7 is a flow diagram of a process for removing duplicate unique hash values. Once a new unique hash value 360 is generated as described above, the following process is evoked. For each new unique hash value 360, the systems determine if there is an identical unique hash value 360 within a database 362 of unique hash values. If no identical unique hash value 360 is found, the systems create a new database record with the new unique hash value 360 with the unique hash value 360 and the tenant ID. If an identical unique hash value 360 is found in the database, the unique hash value 360 is regenerated, and the process repeats.

In order to apply the unique hash value 360 into the IPv6 data plane, the following can be performed by the present systems. On the application 110, If IPv6 is enabled and used as the primary IP stack on endpoint 102, the SSE endpoint policy configuration push can be setup to instruct endpoint 102 to encode the unique hash value in the IPv6 flow label as part of its packet forwarding process. On the SSE platform, with the present model, the SSE platform can utilize its egress forwarding function, to encode the unique hash value in IPv6 flow labels for all or specific IPv6 destinations (SaaS or hosted application services) that enforce an allowed list model.

§ 5.1 Process for Uniquely Labeling Egress Traffic from SSE Platforms

Figure 8:
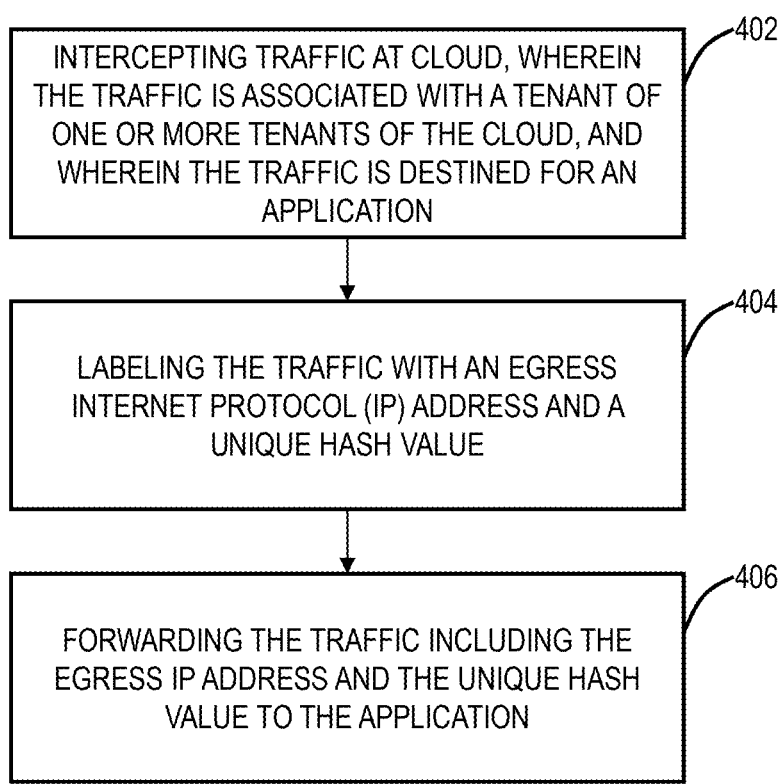
FIG. 8 is a flowchart of a process for uniquely labeling egress traffic from Secure Service Edge (SSE) platforms.

FIG. 8 is a flowchart of a process 400 for uniquely labeling egress traffic from Secure Service Edge (SSE) platforms. The process 400 includes intercepting traffic at cloud, wherein the traffic is associated with a tenant of one or more tenants of the cloud, and wherein the traffic is destined for an application (step 402); labeling the traffic with an egress Internet Protocol (IP) address and a unique hash value (step 404); and forwarding the traffic including the egress IP address and the unique hash value to the application (step 406).

The process 400 can further include wherein the cloud operates as a Secure Service Edge (SSE) provider for the tenant. The application can be a Software-as-a-Service (SaaS) application. The forwarding can include forwarding the traffic via an Internet Protocol version 6 (IPv6) network, wherein the unique hash is inserted thereto as a flow label. The steps can further include generating one or more unique hash values for each of the one or more tenants of the cloud. The steps can further include communicating the one or more unique hash values of each of the one or more tenants to the application. Communicating the one or more unique hash values of each of the one or more tenants to the application can be performed by an administrator of each of the one or more tenants. The steps can further include establishing an Application Programing Interface (API) integration between the cloud and the application; and communicating the egress IP and the one or more unique hash values of the one or more tenants to the application via the API integration. The steps can further include regenerating the one or more unique hash values for each of the one or more tenants of the cloud periodically; and communicating the egress IP and the one or more regenerated unique hash values of the one or more tenants to the application via the API integration. The unique hash value is unique to the tenant and identifiable by the application for determining the tenant of the one or more tenants based thereon.

§ 6.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/ or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:

intercepting traffic at a cloud operating as a Secure Service Edge (SSE) provider wherein the traffic is associated with a tenant of one or more tenants of the cloud, and wherein the traffic is destined for a Software-as-a-Service (SaaS) application;

labeling the traffic with an egress Internet Protocol (IP) address and a unique hash value that is generated for the tenant and uniquely identifies the tenant among the one or more tenants of the cloud; and forwarding the traffic to the SaaS application via an Internet Protocol version 6 (IPv6) network, wherein the forwarding includes inserting the unique hash value into a flow label field of an IPv6 header such that the SaaS application can identify the tenant based on the combination of the egress IP address and the unique hash value.

2. The method of claim 1, wherein the cloud operates as a Secure Service Edge (SSE) provider that enforces tenant-specific policies across a shared egress IP address block without requiring a dedicated egress IP for each tenant.

3. The method of claim 1, wherein the Software-as-a-Service (SaaS) application applies an Internet Protocol (IP) allow-list control policy, and wherein the unique hash value enables the SaaS application to distinguish tenants of the SSE provider despite shared egress IP addressing.

4. The method of claim 1, wherein the forwarding includes forwarding the traffic via the Internet Protocol version 6 (IPv6) network includes inserting the unique hash value into a 20-bit flow label field of an IPv6 header, the flow label being repurposed to identify the tenant to the application.

5. The method of claim 1, wherein the steps comprise: generating one or more unique hash values for each of the one or more tenants of the cloud.

6. The method of claim 5, wherein the steps comprise: communicating the one or more unique hash values of each of the one or more tenants to the application.

7. The method of claim 6, wherein communicating the one or more unique hash values of each of the one or more tenants to the application is performed by an administrator of each of the one or more tenants.

8. The method of claim 6, wherein the communicating comprises:

establishing an Application Programing Interface (API) integration between the cloud and the application; and communicating the egress IP and the one or more unique hash values of the one or more tenants to the application via the API integration.

9. The method of claim 8, wherein the steps further comprise:

regenerating the one or more unique hash values for each of the one or more tenants of the cloud periodically; and communicating the egress IP and the one or more regenerated unique hash values of the one or more tenants to the application via the API integration.

10. The method of claim 1, wherein the unique hash value is unique to the tenant and identifiable by the application for determining the tenant, and wherein the application enforces access based on a tuple of the egress IP address and the unique hash value.

11. A non-transitory computer-readable medium comprising instructions that, when executed, cause one or more processors to perform steps of:

intercepting traffic at a cloud operating as a Secure Service Edge (SSE) provider, wherein the traffic is associated with a tenant of one or more tenants of the cloud, and wherein the traffic is destined for a Software-as-a-Service (Saas) application;

labeling the traffic with an egress Internet Protocol (IP) address and a unique hash value that is generated for the tenant and uniquely identifies the tenant among the one or more tenants of the cloud; and forwarding the traffic to the Saas application via an Internet Protocol version 6 (IPv6) network, wherein the forwarding includes inserting the unique hash value into a flow label field of an IPv6 header such that the SaaS application can identify the tenant based on the combination of the egress IP address and the unique hash value.

12. The non-transitory computer-readable medium of claim 11, wherein the cloud operates as a Secure Service Edge (SSE) provider that enforces tenant-specific policies across a shared egress IP address block without requiring a dedicated egress IP for each tenant.

13. The non-transitory computer-readable medium of claim 11, wherein the Software-as-a-Service (SaaS) application applies an Internet Protocol (IP) allow-list control policy, and wherein the unique hash value enables the SaaS application to distinguish tenants of the SSE provider despite shared egress IP addressing.

14. The non-transitory computer-readable medium of claim 11, wherein the forwarding includes forwarding the traffic via the Internet Protocol version 6 (IPv6) network includes inserting the unique hash value into a 20-bit flow label field of an IPv6 header, the flow label being repurposed to identify the tenant to the application.

15. The non-transitory computer-readable medium of claim 11, wherein the steps comprise:

generating one or more unique hash values for each of the one or more tenants of the cloud.

16. The non-transitory computer-readable medium of claim 15, wherein the steps comprise:

communicating the one or more unique hash values of each of the one or more tenants to the application.

17. The non-transitory computer-readable medium of claim 16, wherein communicating the one or more unique hash values of each of the one or more tenants to the application is performed by an administrator of each of the one or more tenants.

18. The non-transitory computer-readable medium of claim 16, wherein the communicating comprises:

establishing an Application Programing Interface (API) integration between the cloud and the application; and communicating the egress IP and the one or more unique hash values of the one or more tenants to the application via the API integration.

19. The non-transitory computer-readable medium of claim 18, wherein the steps further comprise:

regenerating the one or more unique hash values for each of the one or more tenants of the cloud periodically; and communicating the egress IP and the one or more regenerated unique hash values of the one or more tenants to the application via the API integration.

20. The non-transitory computer-readable medium of claim 11, wherein the unique hash value is unique to the tenant and identifiable by the application for determining the tenant, and wherein the application enforces access based on a tuple of the egress IP address and the unique hash value.

*  *  *  *  *